United States Patent [19]

Altenburger et al.

[11] 3,854,013

[45] Dec. 10, 1974

[54] CALL FORWARDING ARRANGEMENT

[75] Inventors: Otto Altenburger, Rochester, N.Y.; Robert H. Bansemir, Northlake, Ill.; George R. Bergquist, Rochester, N.Y.; Donald J. Mariotti, Fairport, N.Y.; Gunter F. Neumeier, Rochester, N.Y.

[73] Assignee: Stromberg-Carlson Corporation, Rochester, N.Y.

[22] Filed: Apr. 11, 1973

[21] Appl. No.: 350,301

[52] U.S. Cl. .......... 179/18 BE
[51] Int. Cl. .......... H04m 3/54
[58] Field of Search .......... 179/18 BE, 18 BD

[56] References Cited

UNITED STATES PATENTS

| | | | |
|---|---|---|---|
| 2,341,693 | 2/1944 | Clay | 179/18 BE |
| 3,510,598 | 5/1970 | Ballin et al. | 179/18 BE |
| 3,544,729 | 12/1970 | Stevens | 179/18 BE |

FOREIGN PATENTS OR APPLICATIONS

| | | | |
|---|---|---|---|
| 1,043,839 | 8/1965 | Great Britain | 179/18 BE |

*Primary Examiner*—Kathleen H. Claffy
*Assistant Examiner*—C. T. Bartz
*Attorney, Agent, or Firm*—William F. Porter, Jr.

[57] ABSTRACT

Call forwarding services are provided for telephone stations having the appropriate class of service by modifying the dialed signals in the common control register of a station requesting call forwarding services to a station corresponding to dialed signals previously stored in random storage memory. The register, of any one of a plurality of registers, that received dialed digits of the station requesting call forwarding services is identified and the memory is searched for the station to which the call is to be diverted. Prior to the diversion of the call, the party requesting the call forwarding services is signalled in a distinct manner readily recognizable, a call is being diverted. Thereafter, the number of the station to which the call is to be diverted is inserted in the identified register and the connection to the substitute station is completed by the telephone exchange in the same manner as normal calls are completed.

9 Claims, 7 Drawing Figures

CALL FORWARDING ARRANGEMENT

BACKGROUND OF THE INVENTION

This invention relates in general to telephone systems and more particularly to a call forwarding service for telephone switching systems for automatically forwarding, at the request of a subscriber having the appropriate class of service, a call from a first called line, at which that subscriber normally receives his calls, to a preselected second called line, at which that subscriber desires to receive his calls.

Quite often telephone subscribers are delayed in receiving telephone calls or do not receive them at all because those subscribers are away from their telephones when other parties attempt to contact them. The inability to receive important messages promptly is often bothersome and time consuming for the subscriber, who may often be unable to proceed with pressing matters until after he has received the message and who may feel obligated to attempt periodically to call the other parties in an effort to receive the desired information. These repeated attempts may become extremely frustrating if neither of the parties is present at his respective telephone for an extended period of time, especially if a number of "please call back" messages remain unanswered due to the unavailability of rather than through the fault of, either of the parties.

To the telephone company, these repeated unsuccessful attempts mean added traffic, further wear on company equipment and possible loss of revenue. A call forwarding service which can be provided on a per subscriber basis would, therefore, be highly advantageous, both from the point of view of the subscriber and from that of the telephone company. The subscriber can, by paying an additional service charge, be provided with a class of service which would entitle him to be connected to equipment for automatically forwarding calls made to his line to another line at which the subscriber plans to be located and/or to which he requests his calls to be forwarded. The telephone company, in addition to receiving additional revenue, can, with automatic call forwarding equipment reduce some non-revenue bearing traffic and unnecessary wear on its system.

Various prior art systems have been developed by modifying the station equipment or line circuits to provide call forwarding service. In one type of system, the stations having call forwarding service were directly interconnected by an inactive circuit that was operated by a transfer button on the telephone set. The interconnecting circuit, when activated, would direct the calls to the other interconnected preset station. Another call forwarding system requires mechanically preset call forwarding switches at the station and equipment on a per station basis for detecting an incoming call for transfering the connection to a second line and for outpulsing the number preset into the call forwarding switches. Another system required the connection of auxiliary circuits in series with each line circuit having the call forwarding class of service so that the identity of the party to receive the forwarded calls can be dialed into the system control. In each of these above mentioned systems, call forwarding service requires modifications in the line circuits, which is time consuming and very expensive.

Other prior art systems have modified the system control to provide call forwarding services. In systems of limited size, a switchover circuit was provided with the system register that included a storage circuit that would store the identity of the party requesting the call fowarding service and the number of the party to which the call is to be diverted. The output from the register to the marker was modified by the switchover circuit. Such an arrangement will function properly on a system having a single register. However, with larger systems having a plurality of registers, a separate switchover circuit (including a separate memory) for each register is not a feasible approach.

Call forwarding service in another prior art system was accomplished by changing the equipment number of the station requesting call forwarding service in the translator to that of the station to be substituted. However, this system requires an additional data wire in parallel to the speech wires and/or control wires. This method of providing call forwarding services should be designed into the system as it is manufactured, for it cannot be economically added to systems presently in operation. Call forwarding service was also accomplished in the prior art through the use of a stored program processor. However, the use of a stored program processor control is limited, due to cost and specialized maintenance requirements, to use in the large size offices.

It is highly desirable that the call forwarding equipment be provided on an optional basis so that the customer purchasing the telephone system can either request such equipment at the time of purchase or after installation. The stored program processors have this capability by merely changing the system software program. However, in many cases a stored program processor, for a variety of reasons, such as cost and complexity, is not desired by the customer. On the other hand, call forwarding systems that require changes on a line to line basis are also very expensive. Optional call forwarding equipment for switching systems should only require the addition of equipment that will function with the system control to provide those subscribers with the authorized class of service the call forwarding service in a manner that will not materially change the system control, so that such equipment can be readily provided with the initial sale of equipment or at a later time after installation should the need arise. The prior art systems for providing such call forwarding services require a plurality of auxiliary call transfer switchover circuits, each having a dual port appearance in the switching network, which function along with the system control and a memory circuit as an interconnecting circuit for diverting the calls to the designated call forward party. This type of arrangement is undesirable because it requires two connections through the network, one from the calling party to one port of the auxiliary call transfer switching circuit and another from the other port to the party to whom the call is to be forwarded. In addition to the foregoing, if call forwarding is to be provided to a large number of subscribers with an exected large amount of call forwarding traffic requirements, a large number of auxiliary call transfer switching circuits will be required, each having two port entries to the network, thereby increasing the cost of the exchange and limiting the line handling capabilities thereof.

A call forwarding equipment that can be provided on an optional basis should have the capability of readily being added to a telephone system as it is initially sold or by being added to operating equipment. The call forwarding equipment should modify the operation of the system control so that call forwarding service is available to all subscribers on a class of service basis and should not require extensive modification of the system control that would necessitate long periods of shut down for installation. Furthermore, the call forwarding equipment should be able to function with the system control to divert the calls without the need for auxiliary call transfer circuits and/or double connections through the network, and preferably should modify the stored information in the system control to accomplish the diversion in the same manner as normal calls are completed. In the case of large telephone exchanges wherein a plurality of registers are provided for simultaneously handling a large number of calls, the call forwarding equipment should be able to identify the register that is connected to a subscriber requesting call forwarding services so that it can accept the call transfer data, and should also be able to identify the register that is connected to a subscriber attempting to call the call forwarding subscriber to modify the data within the register and complete the diverted call in the same manner as normal calls are completed. The identification of the registers, the receipt of data, and the transfer of data into and out of the registers must be accomplished without disrupting the overall system operation.

In addition to the foregoing, the call forwarding system should provide an indication to the subscriber that his telephone set is in a call forwarding mode of operation so that he does not inadvertently continue to keep his telephone in the call forwarding mode after he has returned. To overcome this problem, a prior art system provided a time out period that was preset by the subscriber at the time of requesting call forwarding services, after which period the call forwarding services were cancelled. Such an arrangement is expensive. Furthermore, the subscriber must thereafter follow his time schedule or else the call forwarding services may be terminated prior to his return, or in the event he returns early and forgets to manually terminate the call forwording services, the calls may continue to be forwarded without his knowledge. In order to prevent the latter situation, a prior art system provided an announcement trunk that was connected to the party requesting call forwarding services that would ring his telephone each time a call was being diverted and provided a recorded message of the same. Under such an arrangement the subscriber could not distinguish these calls from regular calls. In the event the subscriber, in the belief that the time out period had expired, or having forgotten that the call forwarding services were requested, might answer these calls, he would consider them annoying. It would therefore be highly advantageous if the subscriber could be signalled each time a call is being diverted in a manner so that he could distinguish between a diverted call and a regular call and therefore would not answer the diverted call. Furthermore, such an arrangement would continuously remind the subscriber that he is in the call forwarding mode of operation and thereby eliminate the need for a time out apparatus.

It is therefore an object of the invention to provide a new and improved call forwarding apparatus for telephone systems.

It is also an object of the invention to provide a new and improved call forwarding apparatus that can be provided on an optional basis with equipment as it is initially sold or by addition to existing systems.

It is also an object of the invention to provide a new and improved call forwarding apparatus that can be connected to operate with existing telephone systems without substantial changes in the telephone system control.

It is also an object of the invention to provide a new and improved call forwarding apparatus for telephone equipment that functions with the system control to provide call forwarding service only to those subscribers having the appropriate class of service.

It is also an object of the invention to provide a new and improved call forwarding apparatus which functions with telephone exchanges having a plurality of registers and which identifies the registers connected to subscribers involved in call forwarding services, receives data therefrom and transmits data thereto so that the diverted call can be sent as all other calls.

It is also an object of the invention to provide a new and improved call forwarding apparatus that provides a readily distinguishable signal to the subscriber having call forwarding services so that he can readily determine when calls are being diverted.

BRIEF DESCRIPTION OF THE INVENTION

A call forwarding arrangement for common control telephone switching systems for automatically diverting a call initiated by a new calling party for being completed to a first station (the line originating a call forwarding request, i.e., forwarder or original calling party) and completing the call to a second station (forwardee or call forwarding number) designated by the first station (forwarder). Circuit means under the control of the first station (forwarder) receives from the first station via the common control the destination (forwardee) to which a call directed to the first station is to be transferred and stores such destination along with the first station identity in a memory. Means, responsive to an attempted connection from a third station to the first station (forwarder) initiates the application of a distinct signal to the first station (forwarder) indicating that the call to the first station (forwarder) is being diverted, inhibits the connection, and also substitutes the information dialed into the common control by the third party with the designation of the second station (forwardee), whenever the memory includes the identity of the first station (forwarder) along with the designated second station (forwardee). After the substitution of the identity of the second station (forwardee) for the first station (forwarder), the common control is released to complete the connection between the substitute second station (forwardee) and the calling third station in the manner that non-call forwarding calls are complete.

A further feature of the invention includes storage control means which are provided for identifying a register, of any of a plurality of registers available for simultaneously receiving dialed signals from stations, that is associated with the first station when requesting call forwarding services and for storing the number of the substitute second station dialed from the identified register into the memory along with the identity of the first station or erasing from the memory the number of the second station and the identity of the first station. Call diversion control means are provided for identifying a register, of any of the plurality of registers, associated with the third station attempting to complete a connection to the first station, and for searching the memory for the identity of the first station along with the substitute second station. If the memory does not include a stored call forwarding request, a connection between the third and first stations is allowed to be completed. If the memory has a call forwarding request stored therein, the common control is allowed to complete a connection between the first station and a signal circuit to indicate to the first station that a call is being diverted. After signalling the first station, the number of the second station is substituted for the first station in the register associated with the third station to allow the common control to complete a connection between the third and second stations.

In accordance with a further feature of the invention, the first station is notified of a diverted call by a short burst of ringing signals, distinct from the usual ringing signals, so that the subscriber at the first station can readily identify that the call is being diverted and the station is in a call forwarding mode of operation.

The ability of the call forwarding arrangement of the invention to identify the particular register involved in arranging for call forwarding services and/or involved in calls being forwarded, allows the transfer of data into and out of the register without disturbing the normal operation of the other registers serving other calls. There is no need to dedicate any registers exclusively to call forwarding service. Any one of the registers can be used for all calls, normal and call forwarding. Furthermore, an arrangement of this sort can be provided on an optional basis to telephone systems since it does not require substantial changes in the system control and requires no down time to install.

BRIEF DESCRIPTION OF THE DRAWINGS

Other objects, features and advantages of the present invention will become apparent from the following description of a preferred embodiment, taken together with the attached drawings thereof, in which.

DESCRIPTION OF THE PREFERRED EMBODIMENT

Figure 1:
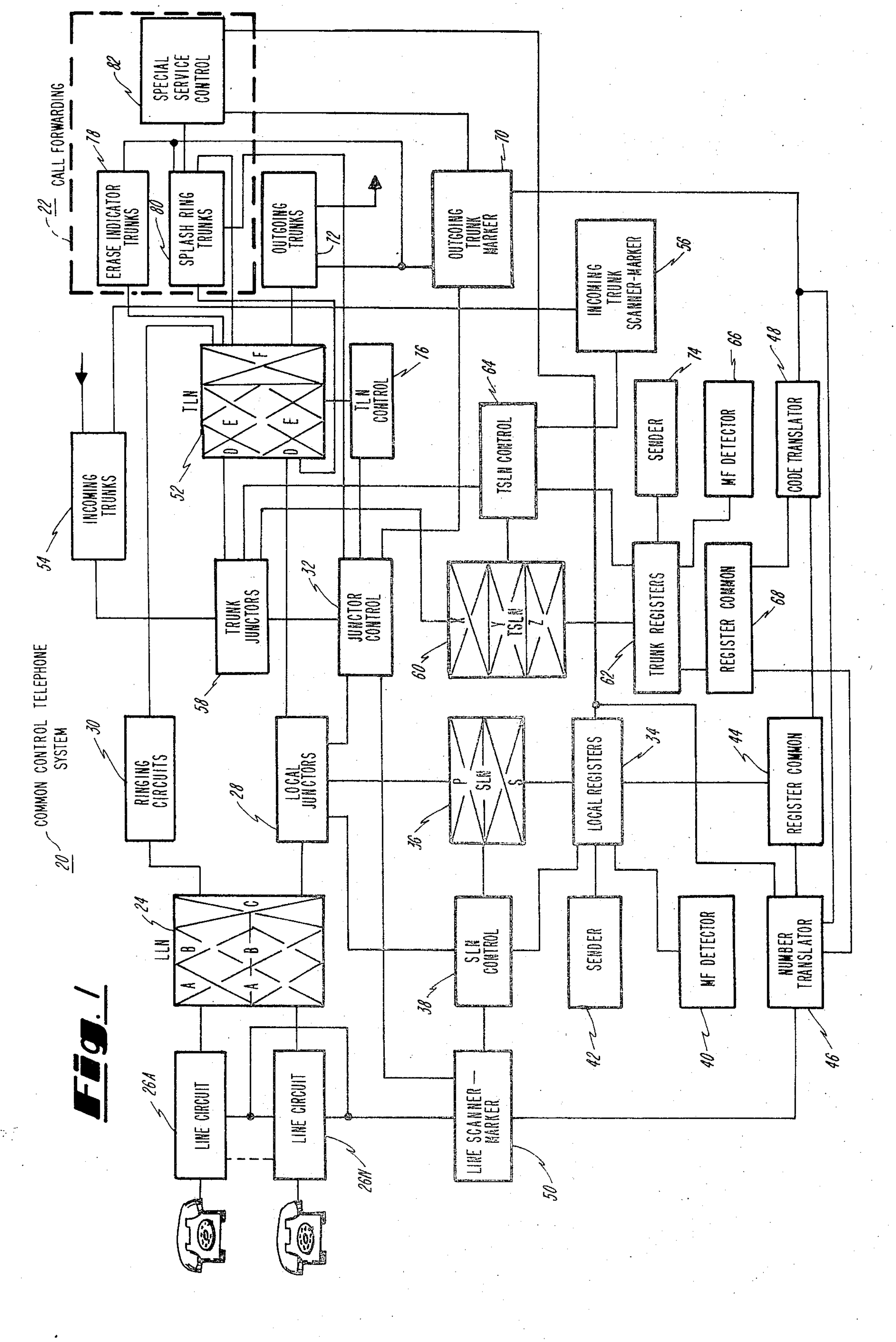
FIG. 1 includes a basic block diagram of a common control telephone system embodying the call forwarding system of the present invention.

Referring now to FIG. 1, there is shown a block diagram of a common control telephone system generally designated 20, including a call forwarding control system constructed in accordance with the invention and generally designated 22.

Common control switching system 20 includes a line link network (LLN) 24 which functions as a concentrator for originating line cells and as a fan-out for terminating calls. The LLN consists of three stages of matrices (A, B, and C), is used for both originating and terminating types of traffic and is connected at one end to a plurality of line circuits 26a–26n, which vary in number depending upon the telephone service to be offered. Line circuits 26a–26n are more fully described in U.S. Pat. No. 3,708,627, entitled, "Plug-In Line Circuit Arrangement," filed on June 15, 1971, in the name of Otto Altenburger and assigned to the assignee of the present invention. LLN 24 provides a unique path between circuits connected to opposite ends of the network. Each of the switching networks in FIG. 1 includes matrix switches consisting of relays, each having a mark or control winding for initially actuating the relay and a hold or sleeve coil connected in series with its own contacts for maintaining the relay in an actuated condition after a path through the network has been established.

The C stage of LLN 24 provides the termination for both originating traffic from line circuits 26a–26n and incoming traffic to the line circuits. These terminations of LLN 24 are connected to local junctors 28 for originating traffic and to ringing controls 30 for terminating traffic. The number of local junctors and ringing controls provided depends upon the traffic requirements for this system. The ringing controls are more fully described in U.S. Pat. No. 3,671,678, entitled, "Ringing Control Circuit," filed on Dec. 22, 1970, in the name of Otto Altenburger and assigned to the assignee of the present invention. Local junctor circuits 28 and their control (by junctor control 32) are more fully described in U.S. Pat. No. 3,705,268, entitled, "Passive Junctor Circuit And Selectively Associated Junctor Control", filed on Dec. 22, 1970, in the name of Otto Altenburger and assigned to the assignee of the present invention.

Local junctors 28 serve as a focal point for all originating type traffic, include provisions for connecting the line circuits to local registers 34 via a service link network (SLN) 36 and provisions for providing transmission battery for calling and called parties on intraoffice calls and are under the control of the calling party. When trunk or station busy conditions are encountered, the local junctors 28 provide the busy tone to the calling party.

Service link network 36 includes two stages of matrices (P and S) and is controlled by a SLN control circuit 38 for connecting the calling line circuits 26a–26n (via one of the local junctors 28) to one of the plurality of local registers 34 which, when connected to local junctors 28, provide dial tone and include apparatus for acting on the instructions of the subscriber. Local junctors 28 terminate at the S stage. The dial pulse acceptors function as an interface between local junctors 28 and the local registers 34. The dial pulse acceptors (DPA's) provide the dial tone to the calling subscriber and also detect rotary dial pulses and extend the pulses to storage sections in local registers 34. In the event of multifrequency signalling by the subscriber, the frequencies are detected by MF detectors 40 connected to dial pulse acceptors. The local registers 34 consist of a DPA, register storage and register output and are connected to a sender 42 for providing outpulsing. The registers and senders are controlled by register common 44 which contains the necessary control units. Local registers 34 are connected to the register common 44 on a time division multiplex basis wherein information is passed from one equipment to another on a common bus basis. Register common 44 is also connected to communicate with a number translator 46 and a code translator 48 on a time division multiplex basis. The translation circuits provide information such as equipment number, ringing code and class of service (COS). The number translator 46 is connected to a line scanner-marker circuit 50 which has the means to detect service requests and means to access the individual line circuits 26*a*–26*n*.

The ringing controls 30 connect ringing generators to terminating or called stations, detect off-hook conditions (ring-trip) of the called station and provide ringback tone for the calling station. Each line circuit can be connected to a plurality of ringing controls which are accessed from a trunk link network (TLN) 52 so that a ringing control is automatically connected to the terminating line circuit as soon as a connection to that line is complete.

Line scanner circuit 50 continuously checks line circuits 26*a*–26*n* for an off-hook condition. The line circuits 26*a*–26*n* are more fully described in U.S. Pat. No. 3,708,627, entitled, "Plug-In Line Circuit Arrangement," filed on June 15, 1971, in the name of Otto Altenburger and assigned to the assignee of the present invention. Line scanner-marker circuit 50 is also used for both the originating and for terminating types of traffic. In the event of originating traffic, the line scanner stops when an off-hook condition is connected and transmits the information from its counter circuits to a marker circuit to mark the particular line circuit 26*a*–26*n* and enables SLN control 38 to initiate a path finding operation between an available local register and the line circuit requesting service. In the event of terminating traffic, line scanner 50 is controlled by number translator 46 and receives an equipment number from number translator 46 to mark the line circuit 26*a*–26*n* with the particular equipment location and in addition, in terminating traffic, line marker 50 also transmits the terminating subscriber classes of service, ringing code, busy or idle status and types of ringing required through junctor control 32 to ringing control 30. Line scanner-marker circuit 50 is more fully disclosed in U.S. Pat. No. 3,699,263, entitled, "Line Scanner and Marker Using Group Scanner," filed on Dec. 23, 1970, in the names of Gunter Neumeier and Otto Altenburger and assigned to the assignee of the present invention.

In operation, when a calling telephone goes off-hook, line scanner-marker 50 detects the off-hook condition and marks the line circuit connection to the A stage of LLN 24. Simultaneously, line scanner-marker circuit 50 signals SLN control 38 to begin a path finding process for connecting the marked line circuit to one of local registers 34. SLN control 38 detects and locates a path in a three step scanning process. During the first scan, the existence of a free path between a free local register 34 and the line circuit is located and the free local register 34 and its corresponding stage S matrix module is identified. During the second scan, a free path through a P stage matrix module is identified. Finally, during the third scan, a free local junctor 28 is identified. The connection of the local junctor 28 to LLN 24 and the connection through SLN 36 are now completed. When path finding is complete, the relay coils of the selected matrix in LLN 24 and SLN 36 are energized. The metallic connections through the tip and ring leads are checked, and if the connection is complete the sleeve coil connections are effected and the connected local junctor 28 is seized. At this time, SLN control 38 and line scanner-marker circuit 50 are released, and the local register 34 is connected to the subscriber to receive dialed information. Once the subscriber information has been dialed into a local register 34, the call must be routed either internally to another local subscriber or externally to another exchange.

Incoming calls from other exchanges are applied to one of a plurality of incoming trunk circuits 54. Incoming trunk scanner-marker circuit 56 continuously scans the incoming trunk circuits 54 for a seized incoming trunk and, when such a seized trunk is located, a scanner circuit stops and transmits the trunk equipment number to a marker circuit, identifying the particular incoming trunk circuit 54. The identified incoming trunk circuit 54 is connected to a trunk junctor 58 (which is essentially identical to a local junctor 28, but is connected between the incoming trunk circuit 54, TLN network 52 and a trunk service line network — TSLN 60). Trunk junctor 58 functions as a focal point for all incoming traffic, includes provisions for connecting the incoming trunk circuit 54 to any one of a plurality of trunk registers 62 via TSLN 60, provides incoming and called parties with transmission battery and, when encountering either trunk or station conditions, returns a busy tone to the incoming call.

A TSLN control 64 is provided and is arranged to locate a path between trunk junctors 58 and trunk registers 62. Trunk junctors 58 are terminated on the X stage matrix modules of TSLN 60 and trunk registers 62 are terminated on the Z stage matrix modules. TSLN 60 is divided into a number of separate grids. The incoming trunk scanner-marker circuit 56 signals TSLN control 64 which of the grids will be used for accessing one of trunk registers 62 as determined by the trunk junctor 58 involved in the connection. Trunk registers 62 include a dial pulse acceptor interface and subcircuits including a register storage and register output. A multifrequency detector 66 is also connected to trunk registers 62 and the subcircuits in trunk register 62 and multifrequency detector 66 are controlled by a register common control 68 on a time division multiplex basis. The register common 68 is connected to communicate with number translator 46 and code translator 48 on a time division basis. Code translator 48 is connected to an outgoing trunk marker circuit 70 and is arranged to identify outgoing trunk groups 72 and is more fully explained in copending patent application Ser. No. 103,267, now U.S. Pat. No. 3,732,377 entitled, "Outgoing Trunk Marker," filed on Dec. 31, 1970, in the names of Otto Altenburger and David Stoddard and assigned to the assignee of the present invention. A sender circuit 74 is also connected to the trunk register 62 to provide outgoing pulsing.

Since trunk junctors 58 are identified by the incoming trunk scanner-marker circuit 56, only a two step scan is required in the path finding scheme of TSLN control 64. During the first scan a free path between a free trunk register 62 and the seized trunk junctor 58 is located, the free trunk register 62 is identified and marked and the connected Z stage module is identified. During the second scan, a free path through the X and Y stage matrix modules to the marked trunk junctors 58 is located, the mark relay coils through the Y and Z stage matrix modules are energized and the mark relay coils through the Z stage matrix modules to the marked trunk register 62 are energized. When the connection between the trunk junctors 58 and the trunk registers 62 is completed, the metallic connections through the tip and ring leads are checked and the sleeve connections are completed. TSLN control 64 and incoming trunk marker 56 are then released. When the incoming information has been received by one of trunk registers 62, the call is either routed internally to a local subscriber or externally to other exchanges via an outgoing trunk 72.

TLN 52 is arranged to provide for termination of local traffic to local subscribers, termination of incoming calls from other exchanges to local subscribers and connections of incoming calls from external exchanges to other external exchanges. TLN 52 includes D and E stage matrix modules and, when further expansion is required, an F stage matrix module. The D stage provides an entrance to TLN 52 and is connected to local junctors 28 and to trunk junctors 58. The exit from TLN 52 is provided by the F stage which is connected via ringing circuits 30 to LLN 24 and to outgoing trunks 72.

A TLN control 76 and junctor control 32 provide path finding through TLN 52 for both internally terminated calls and outgoing calls to a distant office. Number translator 46 and line scanner-marker 50 are utilized to complete calls to local lines, and code translator 48, together with outgoing trunk marker 70, complete calls to trunks. The path finding operation of TLN control 76 includes a two step scan. A local junctor 28, or a trunk junctor 58, has been previously marked (depending upon whether the call being terminated is an incoming call or a locally generated call). In addition, the information in the local or trunk register is transmitted from that register via register common 44 or 68 to either number translator 46 or code translator 48 (again depending upon whether the call is being terminated to a local subscriber or to a distant exchange, respectively). In the event of a call terminating to a local subscriber, number translator 46 marks the line circuit of the terminating call via line scanner-marker circuit 50. In the event of an outgoing call, code translator 48 marks the particular outgoing trunk group 72 via outgoing trunk marker circuit 70. The first scan of TLN control 76 detects a free path through TLN 52 either to the marked outgoing trunk 72 or via a ringing circuit 30 and LLN 24 to a line circuit 26a–26n and identifies the E stage matrix module (the D stage matrix module is previously identified by the seized local or trunk junctor). The second scan identifies and marks the input to the F stage matrix module, completes the connection back through the D and E stage matrix modules to the marked junctor by energizing the matrix mark relay coils and also provides power through the F stage module and LLN 24 to energize the mark relay coils. After a metallic path check is made via the tip and ring leads, the sleeve connections are picked up to complete the connection through TLN 52.

The ringing control 30 now rings the called party. The connections through LLN 24 and TLN 52 and the local or trunk junctors 28 or 58 are maintained during the call under the control of the calling party. When the calling party hangs up, all connections are broken. Should the calling party still remain off-hook after the called party hangs up, provisions are included in the junctor circuits to break the connections after a predetermined period of time.

The interconnection and operation of the common control switching system are more fully described in a copending patent application, entitled, "Path Finding System," Ser. No. 153,221, filed on June 15, 1971, in the names of Otto Altenburger and Robert Bansemir and assigned to the assignee of the present invention.

The call forwarding control system 22 comprises a plurality of erase indicator trunks 78, a plurality of splash ring trunks 80 and a special service control, generally designated 82, which includes a memory for storage of information pertaining to call forwarding requests and a plurality of circuits which control the call forwarding write-in, read and erase operations which will be discussed in greater detail below.

Each of the line circuits 26a–26n which has the call forwarding feature is assigned an appropriate class of service in the number translator 46. When a calling subscriber having the call forwarding class of service goes off-hook, he is connected through the usual methods to a local register 34. The subscriber then dials the number "72" and waits. Line scanner-marker 50 identifies the equipment number of the calling line 26a–26n to number translator 46. The number translator 46, upon receipt of the equipment number of the calling line 26a–26n, determines whether or not the calling party has call forwarding class of service and, if the calling line 26a–26n which has dialed the digits 72 has that COS, a time-out cycle is started. When the connected register 34 times out critically, register common 44 determines (by recognizing the dialed digits 72 and the critical time-out) that the subscriber is attempting a call forwarding write-in (designated type of call — "TOC"-9). Register common 44 clears the 72 from register 34 and notifies special service control 82 via local register 34 to accept the following dialed information for call forwarding purposes. Upon receipt of a write-in signal, special service control 82 transmits a signal to local register 34 to erase the TOC9 information in register 34 and requests the register to send a second dial tone to the calling line 26a–26n. After the calling subscriber receives the second dial tone, he may dial the directory number to which he desires his calls to be forwarded (hereinafter designated "call forwarding number"). The call forwarding number is simultaneously stored in the memory in the special service control and stored in local register 34 to perform a connection between the original calling line 26a–26n and the call forwarding number in the usual manner as described above. The calling subscriber may speak to an individual at the call forwarding number if he so desires (for example, to inform that individual that the calling subscriber is having his calls forwarded to that number) or, upon receipt of the ring back signals, may return his headset on hook.

After the call forwarding number has been stored as described above, when another party attempts to call the line which has requested call forwarding service, the dialed digits will be received by a local register 34.

The directory number of the original calling line 26*a*–26*n* is received in local register 34 and transmitted over a common bus to number translator 46. Number translator 46 recognizes that the original calling number has a call forwarding COS and requests an indication from the special service control 82 whether or not call forwarding service has been requested by the original calling line 26*a*–26*n*. If the original calling line 26*a*–26*n* has not requested call forwarding service, special service control 82 sends a "NO" signal to number translator 46 which marks the original calling line 26*a*–26*n* via line marker 50 to complete the call to the original calling line 26*a*–26*n* in the normal manner. The NO signal also initiates a release sequence which releases special service control 82. Assuming, however, that the original calling line 26*a*–26*n* has requested call forwarding service to a call forwarding number, special service control 82 notifies number translator 46 (by means of a "YES" signal) that the original calling line 26 *a*–26*n* is in a special service mode of operation. Number translator 46 marks outgoing trunk marker 70 to seize a splash ring trunk 80 and requests service from sender 42. The path between the new calling line 26*a*–26*n* and the local register 34 is held by the new calling line 26*a*–26*n*. A switchthrough signal from sender 42 energizes junctor control 32 which starts TLN control 76 and a connection is established from sender 42 through SLN 36, a local junctor 28, and TLN 52 to the splash ring trunk 80. Splash ring trunks 80 are identical to outgoing trunks 72 in many respects; however, the splash ring trunks also have circuitry (explained in greater detail below) which permit them to act similar to trunk junctors 56 and local junctors 28 and to request service from junctor control 32. The splash ring trunk 80 applies a second signal to junctor control 32 which initiates switching in TLN control 76 to complete a path between the splash ring trunk 80 and the original calling number 26*a*–26*n* which is now marked by number translator 46 via line marker 50.

After the splash ring trunk 80 has been seized, outgoing trunk marker 70 applies a signal to number translator 46. After a connection to the original calling line 26*a*–26*n* has been marked, line marker 50 transmits a signal to number translator 46. Special service control 82 is notified that the preceding release signal has been applied to number translator 46 from line scanner 50 and also is notified that a splash ring trunk 80 has been seized and then special service control 82 initiates a time-out cycle.

The time-out cycle permits sufficient time for splash ring trunk 80 to splash ring the original calling line 26*a*–26*n*. The splash ring trunk 80 connects the original calling line 26*a*–26*n* to the ringing generator provided for the common control system, while the voice circuits in splash ring trunk 80 remain disconnected, and a single short burst of ringing signals is applied by the ringing generator via the splash ring trunk 80 to the original calling line 26*a*–26*n*. After the elapse of a predetermined time, sender 42 is released, which in turn releases splash ring trunk 80 from the circuit. Then, special service control 82 replaces the dialed signals which were stored in the local register 34 with the previously dialed call forwarding signals stored in the memory in special service control 82. A "memory request eleven" signal is then stored into the local register 34 by special service control 82 and sent to number translator 46 to request translation of a new number. New signals (corresponding to the call forwarding equipment number) are now stored in local register 34 by special service control 82 and are applied to number translator 46 which marks the call forwarding line and a connection is now completed between the new calling party and the call forwarding line in the usual manner.

When the original calling subscriber desires to remove his call forwarding request from storage in special service control circuit 82, he goes off hook and dials the digits "73." Code translator 48 recognizes the dialed digits and that the original calling subscriber has call forwarding COS and initiates a critical time-out. The register common 44, upon receiving the critical time-out signal and recognizing the 73 digits in local register 34, determines that a call forwarding request for erase (designated TOC8) is present, clears the 73 from local register 34 and notifies special service control 82 to scan the memory for the data which the original calling subscriber stored therein and to erase that data. The special service control 82 searches the memory for an address with a zero code (the call forwarding code which was stored in the memory address during the write operation) together with the equipment number of the original calling line and, when that address is located, writes all zeros in that address to erase the stored request for call forwarding service. When the zeros are written into the address, a release sequence for releasing special service control 82 is initiated. After the zeros have been written in the memory address, special service control 82 transmits a "memory request seven" signal (requesting seizure of an erase indicator trunk 78) to local register 34. Code translator 48 recognizes the memory request seven signal and marks outgoing trunk marker 70 to seize an erase indicator trunk 78. The path between the original calling line 26*a*–26*n* and local register 34 via a local junctor 28 is held by the original calling line 26*a*–26*n*. A switchthrough signal from code translator 48 energizes junctor control 32 which starts TLN control 76. The connection to local register 34 is dropped and a connection is established from the local junctor 28 through TLN52 to the erase indicator trunk 78. After the erase indicator trunk 78 has been seized, the erase indicator trunk 78 sends a double tone to the original calling line 26*a*–26*n*, the calling subscriber may return on hook and subsequent calls to lines 26*a*–26*n* are terminated in the normal manner. After erase indicator trunk 78 sends the double tone to the original calling line 26*a*–26*n*, erase indicator trunk 78 disconnects itself from TLN52 in the conventional manner.

Figure 2:
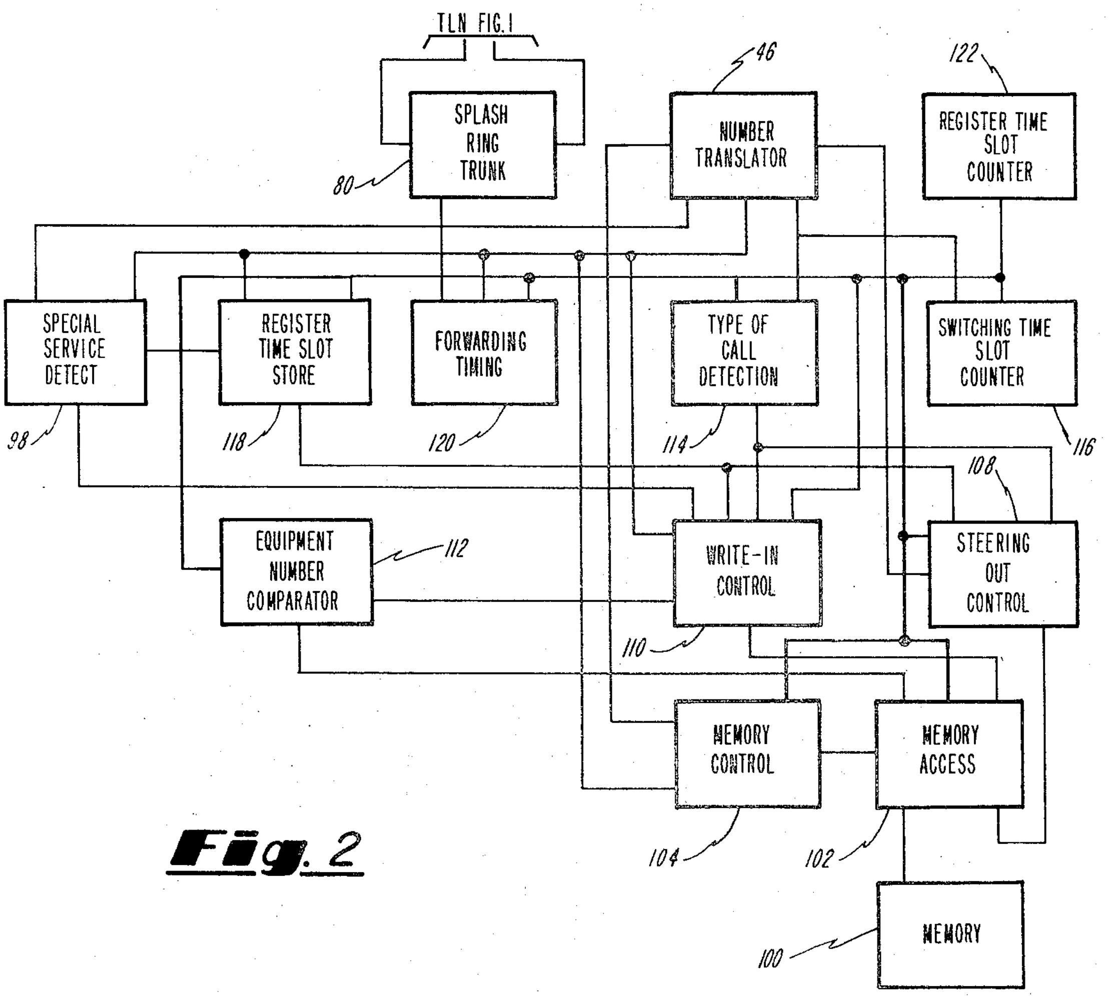
FIG. 2 is a block diagram showing the call forwarding system, together with associated portions of the common control system, in greater detail than was shown in FIG. 1.

Referring now to FIG. 2, call forwarding system 22 will be described in greater detail. Call forwarding system 22 is provided with a special service detect circuit 98 which is arranged to detect when the call forwarding system is to be used and to generate signals for initiating the procedures for call forwarding operations.

More particularly, special service detect circuit 98 includes a critical time-out (CRTO) flip-flop, two type of call (TOC) storage circuits, TOC8 and TOC9 decoder circuits, two code store circuits, an equipment number storage circuit, a read enable flip-flop, a translator questions memory (TQM) flip-flop, an erase (ERA) flip-flop and circuitry which is arranged to erase the TOC signals in the local register 34 and to send a request to the local register 34 to apply a second dial tone to the original calling line 26*a*–26*n*. When a local register 34 which is associated with a call forwarding call times out critically, the CRTO flip-flop is set and enables type of call signals which subsequently appear on the data bus of the register 34 to be stored in the TOC storage circuits. When a TOC9 is stored in the first TOC storage circuit, the TOC9 decoder circuit has an output and a call forwarding write-in operation, during which the original calling subscriber writes the call forwarding number into the memory, is initiated. When a TOC8 is stored in the other TOC storage circuit, the TOC8 decoder has an output and a call forwarding erase operation, during which the original calling subscriber removes the call forwarding request from his line by writing zeros into the memory address in which he had previously written data corresponding to the call forwarding numbers, is initiated. (Each of these preceding circuits will be shown and discussed in greater detail below when the write-in, read and erase modes of operation of the call forwarding system are described in conjunction with FIGS. 3, 4 and 5, respectively.)

Call forwarding system 22 also includes a memory circuit 100 which is arranged to receive, via a memory access circuit 102 (which gates data into and out of the memory 100), and to have stored in each address thereof bits of data corresponding to a code which indicates call forwarding, to the equipment number of the original calling line 26*a*–26*n*, to the directory number of the call forwarding number, to the type of call forwarded (local or EAS), and to the number of digits expected for the type of call stored.

Call forwarding system 22 is also provided with a memory control circuit 104 which is arranged to scan the memory addresses under the control of a plurality of scanning flip-flops which are sequentially set by a binary counter driven by a memory clock in the conventional manner. The scanning flip-flop circuits are set, respectively, to initiate a first scan of the memory (during the write-in, read and erase modes of operation of the call forwarding system) for predetermined stored information corresponding to the equipment number of the original calling line 26*a*–26*n* and to the code for call forwarding (during the write-in mode of operation only), to initiate a second scan of the memory, for an available address if the predetermined stored information was not found during the first memory scan, and to initiate connection of the original calling line 26*a*–26*n* to an intercept trunk (during the erase mode of operation only) if the predetermined stored information is not located during the two first scans. A steering-out control circuit 108 is included in call forwarding system 22 and is arranged to gate stored information out of memory 100 via memory address circuits 102 into a local register 34 during the proper call forwarding system time slots. A write-in control circuit 110 is also provided and has a plurality of digit store circuits, which are arranged to store data which is to be written into the memory 100, and a write flip-flop circuit, which enables the stored data to be written into the memory from the digit storage circuits after write-in control circuit 110 has been enabled by an equipment number comparator circuit 112. The write flip-flop also transmits a signal, when the data is being written into the memory 100, to release circuitry which initiates a release sequence for circuits which had been set during the write-in operation.

Equipment number comparator circuit 112 contains an equipment number storage circuit which is arranged to store the equipment number of the original calling line 26*a*–26*n*. The equipment number stored in the equipment number storage circuit and the code stored in the code storage circuit in special service detect circuit 98 define an address index (which is utilized to determine whether an original calling line has requested call forwarding). Equipment number comparator circuit 112 also includes a compare circuit which compares the digits in the address index with data stored in the memory addresses when memory 100 is being scanned by memory control circuit 104 and which generates an identity (IDENT) signal if the stored data in a memory address is identical to the data currently stored in the address index. During the call forwarding system write-in mode of operation the identity signal sets an identity flip-flop in equipment number comparator circuit 112 which enables the write-in flip-flop to permit write-in of call forwarding information (code for call forwarding, equipment number of the calling line, directory number of the call forwarding number, type of call and digits expected) into an address in the memory 100. During the read mode of operation of the call forwarding system, when a new calling line is attempting to terminate to an original calling line, which has the call forwarding COS and which has requested call forwarding service, memory control circuit 104 scans the memory 100 to determine if a line with the call forwarding COS has requested call forwarding (by scanning for the call forwarding code and equipment number of the line) and, if that stored information is found, the IDENT signal enables an AND gate which transmits a YES signal to the number translator 46, as was described above. During the erase mode of operation of the call forwarding system the memory control circuit 104 scans the memory for the equipment number of the original calling line 26*a*–26*n* and the call forwarding code and, if an identity is found, the IDENT signal enables the write-in flip-flop to write all zeros into the memory address in which the identity was found and permits a signal to be transmitted by special service control 82 to initiate termination to an erase indicator trunk 78, which sends back a double tone to the original calling line 26*a*–26*n*, as was described above.

A type of call detection circuit 114 is included in call forwarding system 22 and comprises a type of call and digits expected (TOC & DEX) storage circuit, an enable number storage flip-flop circuit and a stop type of call flip-flop circuit which are utilized during the write-in mode of operation of the system. When a subscriber with call forwarding COS has received a second dial tone back after having dialed the digits 72, he dials the directory number of the line to which he desires his calls to be forwarded. Register common 44 determines the TOC dialed (local or EAS) and transmits the TOC signal to the bus of local register 34. The data thus transmitted to the register bus is sent to the TOC & DEX store which determines and stores the number of digits expected (DEX) for that TOC (4 for local and 7 for EAS). When the TOC and DEX have been stored, the TOC & DEX storage circuit first sets the enable number storage flip-flop which enables the directory number of the call forwarding number (which subsequently appears on the register bus) to be gated from the register bus to a digit store circuit in write-in control circuit 110 and then sets the stop type of call flip-flop to inhibit further storage of TOC information in the TOC storage circuits of special service detect circuit 98. When the number of digits stored in the digit store circuit (in type of call detection circuit 114) equals the digits expected for the TOC, the TOC & DEX storage circuit has an output which enables storage of the equipment number of the original calling line *26a–26n* from the bus of register 34 into the address index in equipment number comparator circuit 112 which in turn enables scanning of the memory 100 by memory control 104.

Call forwarding system 22 also is provided with a plurality of timing and sequencing circuits including a switching time slot counter 116, a register time slot storage circuit 118 and a forward timing circuit 120. Time slot counter 116 comprises a synchronous binary counter which generates sixty-four call forwarding system time slot pulses during each register time slot of the common control system and has its time slot one (TS1) synchronized with the first time slot of each register time slot of the common control system. Register time slot storage circuit 118 includes two enabling circuits each including a binary counter which counts the register time slots of the common control system which are provided by the register time slot counter 122 of the common control system, a digit store circuit which is arranged to be enabled to store the numbers of particular registers being scanned by the binary counter during the write-in, read and erase modes of operation of the call forwarding system (as will be explained in greater detail with respect to FIGS. 3–5), and a digit comparator circuit which is arranged to compare the register number stored in the last-mentioned digit store circuit with the register numbers as they are counted by the binary counter and to have an RTS output (which enables various operations hereinafter described) when the binary counter output and the stored number in the digit store circuit are identical.

Forward timing circuit 120 comprises a synchronous binary counter circuit which is utilized during the process of forwarding a call to a call forwarding number. The operation of the forward timing circuit is initiated when the above-mentioned release signal (FWRQ) is received from outgoing trunk marker 70 and line scanner 50 (indicating a splash ring trunk 80 has been marked) and the subsequent release signal (SPLR) is received from a splash ring trunk 80 (indicating that the splash ring trunk 80 has been seized). Two hundred and fifty-six milliseconds after the counter in forward timing circuit 120 is started, the forward timing circuit 120 transmits a signal to local register 34 which causes release of sender 42 removing the loop to the splash ring trunk 80 which in turn releases.

A signal which causes removal of the switchthrough signal from register 34 is transmitted by forward timing circuit 120 to local register 34 640 milliseconds after the counter begins counting. Seven hundred and sixty-eight milliseconds after the initiation of forward timing circuit 120, the read enable flip-flop in special service detect circuit 98 is set to enable reading out of data stored in the memory 100 to the bus in local register 34. The memory request eleven signal is then transmitted by forward timing circuit 120 via steering-out control circuit 108 to number translator 46 to request a final translation of the data on the register bus in order to effect termination to the call forwarding number. After the data is read out of the memory, a signal is transmitted by the forward timing circuit 120 which starts a release sequence to prepare the circuitry associated with the read operation for subsequent read operations.

Figure 3:
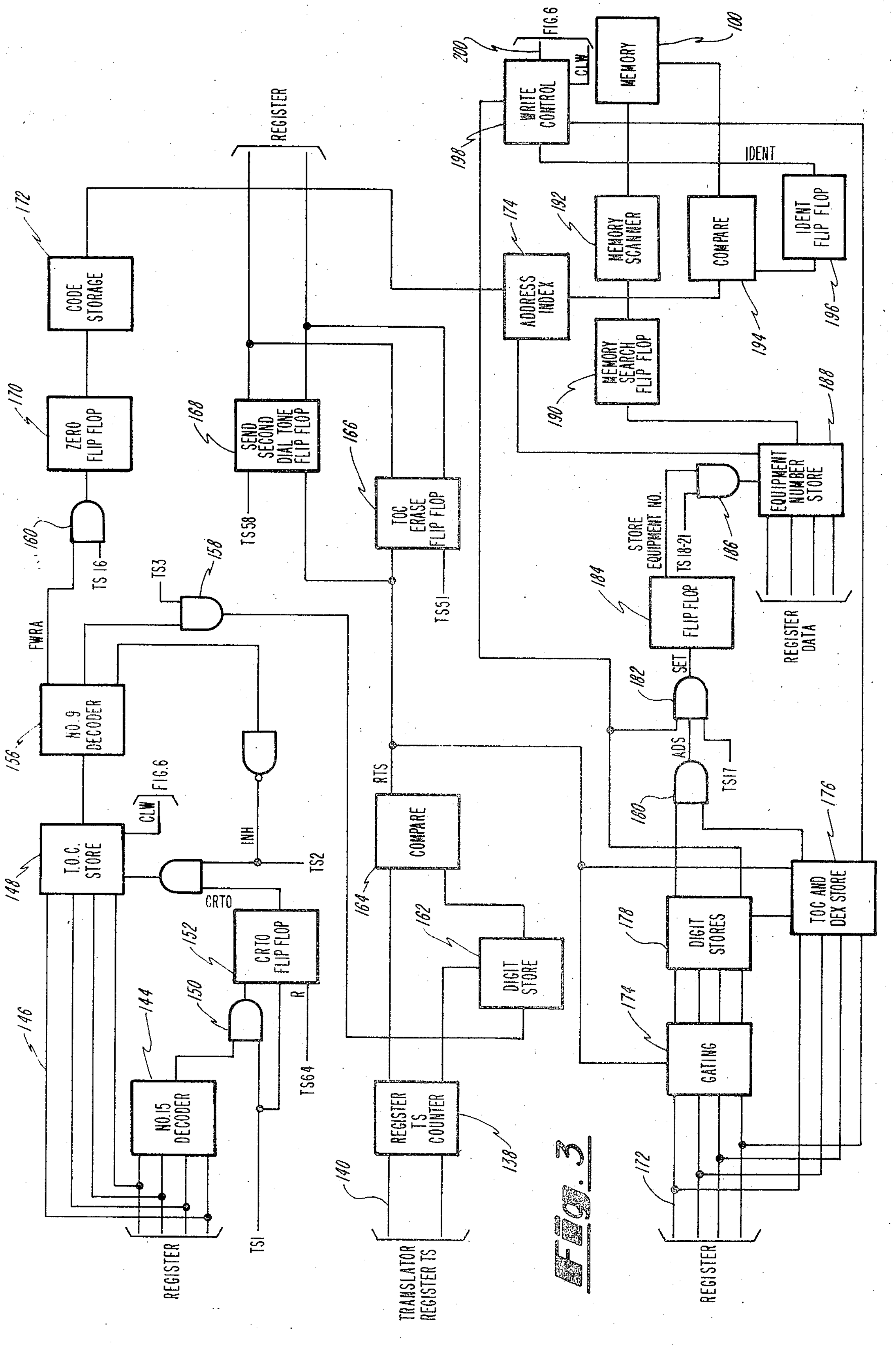
FIG. 3 is a block diagram showing portions of the call forwarding system associated with write-in of information into the call forwarding system memory to store cell forwarding requests.

Referring now to FIG. 3 the operation of the call forwarding system during a write-in operation will be described in greater detail. After the original calling subscriber has dialed the 72 code, register common 44 clears the 72 from local register 34 and notifies special service control 82 to accept the subsequently dialed information for call forwarding purposes. The plurality of local registers 34 are scanned or interrogated in a preset sequence by register common 44 in a manner so that only the one register being scanned or interrogated at a given time will apply and/or accept data from its bus. A register time slot counter 138 in register time slot store circuit 118 is synchronized with the scanning by register common 44 via number translator 46. The registers 34 being scanned are identified by the common control system register time slots which are sequentially transmitted from register time slot counter 122 via number translator 46 to register time slot counter 138 over lines 140. The data from each of the register busses is sequentially applied over a plurality of lines 142 to a number fifteen decoder 144 and over a plurality of lines 146 to the type of call (TOC) storage circuit 148 in special service detect circuit 98. When one of local registers 34 being scanned has the code 72 dialed therein and has a critical time-out, a number fifteen signal from number translator 46 is applied over lines 146 to the number fifteen decoder 144. Call forwarding system time slot counter 118 continuously applies time slot signals to special service control 82 for synchronizing the operations thereof each time a different register 34 is interrogated. If one of the local registers 34 in the common control system — for example, No. 5 register — has a critical time-out, number fifteen decoder 144 has an output to an AND gate 150 during call forwarding system time slot 1 (TS1) of the call forwarding system. The combination of the output from number fifteen decoder 144 and the TS1 signal sets the critical time-out (CRTO) flip-flop 152 in special service detect circuit 98 and if, during call forwarding system time slot 2 (TS2), CRTO flip-flop 152 has been set, the TOC store 148 is enabled via AND gate 154 to have an output to a number nine decoder 156. As was previously mentioned, the presence of a TOC9 signal on the bus of register 34 denotes the call forwarding write-in mode of operation. When a type of call "9" is detected by the number nine decoder 156, an FWRA signal is applied by a number nine decoder 156 to AND gates 158 and 160. Simultaneously, number nine decoder 156 applies an inhibit signal to AND gate 154 to prevent further storage in TOC store circuit 148 in subsequent call forwarding time slots. During the next call forwarding system time slot TS3, one digit store circuit 162 in register time slot store circuit 118 is enabled via AND gate 158 and stores the register number associated with the subscriber requesting call forwarding services (for example, common control system No. 5 register) from register time slot counter 138, which has translator register time slots as inputs from common control system register time slot counter 122 over lines 140. The digit store 162 identifies and "memorizes" the particular register number associated with the subscriber requesting call forwarding services. The count in register time slot counter 138 and the digits stored in digit store circuit 162 are applied to a compare circuit 164 which is arranged to generate an RTS output signal when the two inputs thereto are identical and thereby to indicate that the number of the register associated with the write-in mode of operation is stored and to identify the register when it is subsequently interrogated. Thus, an RTS signal is generated when a local register 34 has critically timed out (had a fifteen on its bus during system time slot TS1 and a nine on its bus during system time slot TS2) and is repeated each time the register 34 having its number stored in digit store 162 is interrogated or scanned by register common 44 and register time slot counter 138.

During call forwarding system time slot TS16, AND gate 160 is enabled and sets a zero flip-flop 170 (in special service detect circuit 98) which stores the zero code for call forwarding in code storage circuit 172. The zero code stored in code storage circuit 172 defines a portion of the address index 174.

When a register 34 which has critically timed out is being scanned by register time slot counter 138 the RTS signal generated by the compare circuit 164 is applied to a TOC erase flip-flop circuit 166 and to a send second dial tone flip-flop circuit 168, both of which have outputs over lines 170 connected to the registers 34. Only the register associated with the subscriber requesting call forwarding service that is enabled by the scanning sequence of register common 44 while the RTS signal is present will accept these signals. During call forwarding system time slot TS51, the type of call erase flip-flop is set and transmits a signal to the connected register 34 which erases the TOC9 signal present in the register 34. During call forwarding system time slot TS58, the send second dial tone flip-flop is set and sends a signal which is transmitted to the register 34 which causes a second dial tone to be sent from the register dial pulse acceptors to the original calling line 26*a*–26*n* which is requesting call forwarding service.

After the calling subscriber receives the second dial tone he dials the directory number of the call forwarding number into the register 34. The data is transmitted by the register bus via lines 172 to a gating circuit 174 and to the type of call and digit expected (TOC & DEX) storage circuit 176. TOC & DEX storage circuit 176 determines the particular type of call (i.e., local or EAS) and the number of digits expected for that particular type of call and enables the digit store circuit 178 in write-in control circuit 110 and an AND gate 180. When AND gate 180 is enabled, AND gate 180 applies an all digits stored (ADS) signal to an AND gate 182 which is enabled by the combination of ADS and RTS during time slot TS17. The enabling of the AND gate 182 sets a store equipment number flip-flop 184 which enables one input to an AND gate 186. AND gate 186 which is enabled during time slots TS18 – TS21 and enables in turn, equipment number store circuit 188 to store the equipment number of the original calling line from the data bus of register 34.

The equipment number stored in equipment number store 188 completes the address index 174 (which is shown as a separate circuit for purposes of explanation) and the memory search flip-flop 190 is set. When the memory search flip-flop 190 is set, the memory scanner circuit 192 is started and begins a sequential scan of the addresses in memory 100. A compare circuit 194 associated with the memory scanner circuit 192 compares the information in address index 174 (the zero code from code storage circuit 172, and the equipment number from the equipment number store circuit 188) with index information in the memory addresses. Memory scanner circuit 192 first scans for information which is identical to that present in the address index 174 (to see if call forwarding was previously requested by the same original calling line 26*a*–26*n*). If memory scanner circuit 192 finds that the original calling line equipment number and the zero code are present in a memory address, it will stop and utilize that address, and the new call forwarding request will be written, as described below, over the data stored in the memory address. If the memory scanner circuit 192 does not locate a previously stored call forwarding request for the original calling line, a second scan of the memory is initiated to find a free address and stop. When a desired address has been located, during the first or second scan, compare circuit 194 sets an identity flip-flop 196 which enables a write control circuit 198. Write control circuit 198 writes the call forwarding number from the digit store circuit 178 together with the information in the TOC & DEX store circuit 176 and the index information in address index 174, into that particular address of the memory. During the write-in of data, the write control circuit 198 initiates a release sequence over line 200 and the release sequence (as will be described in greater detail with respect to FIG. 6) which resets the write flip-flop in write-in control 198 and clears TOC storage circuit 148 after the information is stored in order to prepare the write-in circuitry for use for other call forwarding requests. CRTO flip-flop 152 is reset in time slot TS64.

If during the first two scans of the memory 100, neither a previously stored request for the original calling line nor a free address is located, an address not available flip-flop in memory scanner circuit 192 is set and transmits a signal which either may be sent to the local register 34 to request connection of the original calling line 26*a*–26*n* to an intercept trunk in order to inform the subscriber that his dialed call forwarding request was not stored or utilized to initiate a release sequence for special service control 82.

Figure 4:
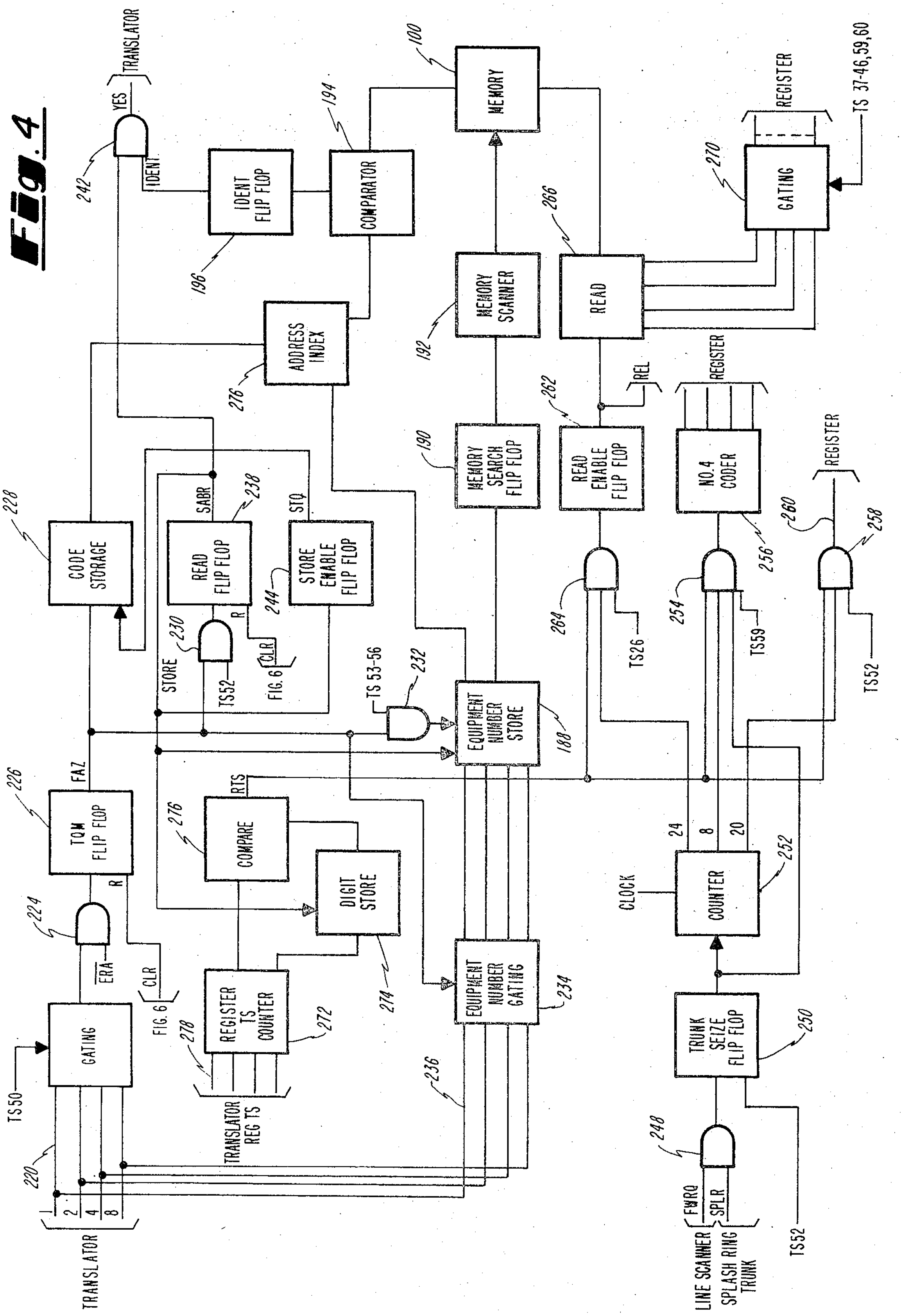
FIG. 4 is a block diagram showing portions of the call forwarding system which are associated with the reading out of information from the memory during forwarding of a call to a preselected number.

Referring now to FIG. 4, the read mode of operation of the call forwarding system will be described in greater detail. As was previously mentioned, when a calling party attempts to call the original calling line 26*a*–26*n*, the directory number of the original calling line is received in the local register 34 and transmitted to number translator 46. The number translator 46 after translation recognizes that the original calling line has call forwarding class of service and requests the special service control 82 during call forwarding system time slot TS50 to indicate whether or not a call forwarding request has been previously stored by the original calling line 26*a*–26*n*. During call forwarding system time slot TS50 a question signal (bit 8) is sent from number translator 46 over lines 220 to a gating circuit 222 which has output to an AND gate 224 which in turn is enabled if the call forwarding system is not already in the erase mode of operation (to be discussed in greater detail below). The enabling of AND gate 224 sets the translator questions memory (TQM) flip-flop 226 which applies a fake zero (FAZ) output to the second code storage circuit 228 in special service detect circuit 98 and to AND gates 230 and 232. The fake zero signal also enables an equipment number gating circuit 234. Number translator 46 now sends the equipment number of the original calling line 26*a*–26*n* over lines to an equipment number gating circuit 234.

During call forwarding system time slot TS52, AND gate 230 is enabled and sets the read flip-flop 238. Read flip-flop 238 has an (SABR) output which partially enables an input over line 240 to an AND gate 242. The SABR signal from read flip-flop 238 also sets a store enable flip-flop 244, which enables (via its STO output) storage of the fake zero code in code storage circuit 228.

A second enabling circuit including a register time slot counter 272, a digit store circuit 274 and a compare circuit 276 is provided for the read operations of call forwarding system 22 in order to enable the system to perform read operations (i.e., forward calls to call forwarding numbers) while permitting write-in operations requested by additional calling subscribers with the call forwarding COS. Register time slot counter 272 has translator register time slots as inputs from the common control system over lines 278. The SABR signal from read flip-flop 238 enables digit store circuit 274 to store the register number associated with the subscriber requesting call forwarding service from register time slot counter 272. The count in register time slot counter 272 and the digits stored in digit store circuit 274 are applied to compare circuit 276 which is arranged to generate an RTS output signal when the two inputs thereto are identical and thereby to indicate that the numbers of the repeater associated with the read mode of operation is stored and to identify the register when it is subsequently interrogated. Thus, RTS signal is generated when a local register 34 has critically timed out (had a fifteen on its bus during system time slot TS1 and an eight on its bus during system time slot TS2) and is repeated each time the register 34 having its number stored in digit store 274 is interrogated or scanned by register common 44 and register time slot counter 272.

During time slots TS53 – TS56 of the time slot counter, AND gate 232 is enabled which in turn enabled equipment number store circuit 188 to store the equipment number of the original calling line 26*a*–26*n* via equipment number gating circuit 234. The zero code from code storage circuit 228 and the equipment number of the original calling line 26*a*–26*n* in equipment number store 188 define an address index 246 (for both read and erase modes of operation) and the memory search flip-flop 190 is enabled to initiate scanning by memory scanner circuit 192 of the memory 100 for an address which has stored therein the data in address index 246 (i.e., memory scanner circuit 192 scans for a stored call forwarding request for original calling line 26*a*–26*n*). When such an address is located, comparator circuit 194 sets identity flip-flop 196 which has an output (IDENT) which enables AND gate 242 to transmit a YES signal to number translator 46 (the YES signal indicates that the original calling line 26*a*–26*n* has requested call forwarding service).

Number translator 46 marks the outgoing trunk marker 70 to seize a splash ring trunk 80 and requests a sender 42. As was explained above with reference to FIG. 1, a switchthrough signal from sender 42 starts the junctor control 28 which in turn starts the TLN control 76 and a connection is established from the sender 42 through SLN 36, a local junctor 28 and TLN 52 to the splash ring trunk 80. Splash ring trunk 80 sends a second signal to junctor control 28 which initiates switching in TLN control 76 to complete a path from splash ring trunk 80 to the original calling line 26*a*–26*n* and splash ring trunk 80 (discussed in greater detail below) applies a single ringing burst to (or "splash rings") the original calling line 26*a*–26*n*. A first signal (FWRQ) which indicates a release from the trunk marker 70 and the line scanner 50 is applied to AND gate 248 and a release signal (SPLR) from splash ring trunk 80 indicating the splash ring trunk 80 is connected to the original calling line 26*a*–26*n* enables AND gate 248 which in turn enables a trunk seizure flip-flop 250. Trunk seizure flip-flop 250 is set during call forwarding system time slot TS52 and enables a counter circuit 252 and also enables one input to an AND gate 254.

Clock pulses drive counter 252 and, when a count of eight is reached, counter 252 enables a second input to AND gate 254. The RTS output of compare circuit 276 defines a third input to AND gate 254 which is enabled during call forwarding system time slot TS59. The output of AND gate 254 enables a number four coder 256 which transmits a memory request four (which requests release of sender 42) to the local register 34. This releases the splash ring trunk circuit 80. When a counter of twenty is reached in counter 254 an AND gate 258 is enabled during the next call forwarding system time slot TS52 and transmits a signal to local register 34 to reset the switchthrough circuit in the register. After the count of twenty-four in counter 252, a read enable flip-flop 262 is set during the next call forwarding system time slot TS26 by an AND gate 264. Read enable flip-flop 262 enables a read circuit 266 and generates over lines 268 a begin release sequence signal to initiate resetting of the read circuitry in order to prepare the circuitry for subsequent operations. The read circuit 266 reads the data in the memory address which was located by the memory scanner circuit 192, and the directory number of the call forwarding line, the TOC and the DEX are gated to the register bus via a gating circuit 270 during call forwarding system time slots TS37 – TS46, TS59 and TS60. The local register 34 receives the call forwarding directory number and a memory request eleven signal is sent to local register 34 from forward timing circuit 120 and register 34 sends a request to number translator 46 for translation to the new number. A switchthrough is generated and the call is terminated to the call forwarding number in the manner described above.

Figure 5:
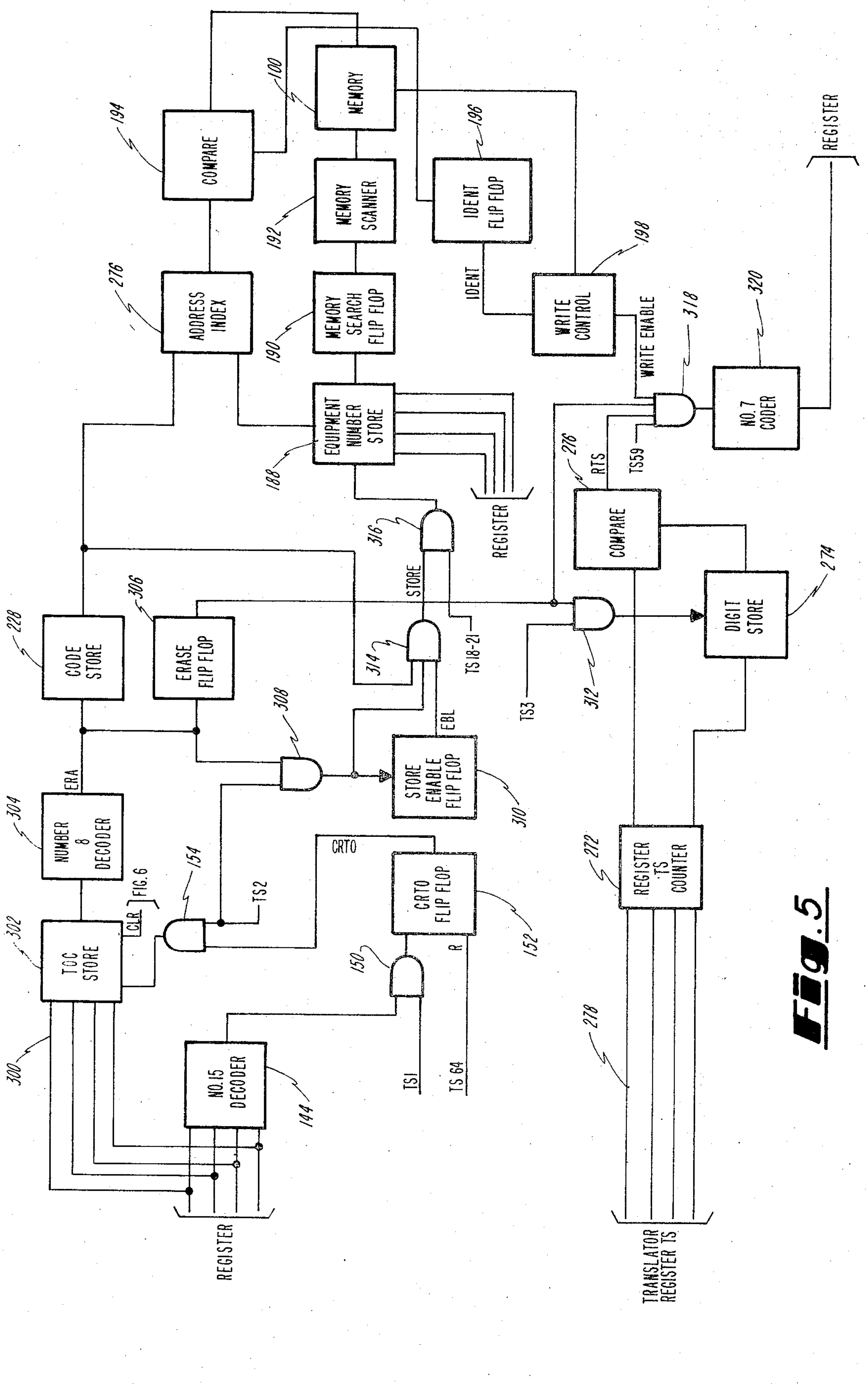
FIG. 5 is a block diagram showing portions of the call forwarding system which are associated with erase operations during which call forwarding requests are removed from the system memory.

Referring now to FIG. 5, the erase mode of operation of the call forwarding system will now be described in greater detail. When the original calling subscriber desires to remove a call forwarding request from storage in the memory 100, he dials the digits 73. The code translator 48 recognizes the dialed digits and that original calling line 26*a*–26*n* has call forwarding COS and initiates a critical time-out. Three seconds later, the critical time-out has occurred and a fifteen appears on the register bus during time slot TS1. The fifteen is transmitted via lines 142 to number fifteen decoder 144. AND gate 150 is enabled and sets critical time-out flip-flop 152. Register common 44 upon receiving critical time-out signal and recognizing the 73 dialed digits in the register determines that a call forwarding request for erase is present and clears the 73 from local register 34. A type of call number eight is transmitted to the local register 34 by the register common 44. The TOC8 signal is applied over a plurality of lines 300 from register 34 to a second TOC storage circuit 302 in special service detect circuit 98. TOC storage circuit 302 is enabled to store data that is present on line 300 by AND gate 154 during time slot TS2 and has its output connected to a number eight decoder 304. As was mentioned previously, the presence of a TOC8 signal on the bus of register 34 denotes a call forwarding erase mode of operation. When a TOC8 is detected by the number eight decoder 304, an erase (ERA) signal is applied by number eight decoder 304 to code storage circuit 228, to an erase flip-flop 306 and to an input to an AND gate 308. In addition the not erase $(\overline{ERA})$ signal which defines an input to an AND gate 224 (FIG. 4) goes low to inhibit the read circuitry during the erase mode of operation. During time slot TS2 AND gate 308 is enabled and sets an enable store flip-flop 310.

The enabling circuit including register time slot counter 272, digit store circuit 274 and compare circuit 276 which were employed to generate the RTS signal in the read mode of operation of call forwarding system 22 are also utilized during the erase mode of operation.

The output of erase flip-flop 306 enables an AND gate 312 during time slot TS3 and AND 312 enables digit store circuit 274 to store the number of the register 34 associated with the erase mode of operation. Compare circuit 276 generates an RTS output signal when a local register 34 has critically times out (had a fifteen on its bus during time slot TS1 and an eight on its bus during time slot TS2) and repeats the RTS output each time the register 34 having its number stored in digit store 274 is interrogated or scanned by register common 44 and register time slot counter 272. An AND gate 314 is enabled by code store circuit 228, AND gate 308, and enable store flip-flop 310, and transmits a store (STORE) signal to an AND gate 316 which is enabled during system time slots TS18 – TS21 and permits storage of the original calling line **26*a*–26*n* equipment number in equipment number store circuit 188. The zero code in code storage circuit 228 and the equipment number in equipment number store 188 again define the address index 276. Memory search flip-flop 190 is set and starts memory scanner circuit 192 which scans the memory for an address location in which the zero code and the calling line equipment number are stored. When compare circuit 190 locates such an address, it sets identity flip-flop 196 which transmits an identity (IDENT) signal to write control circuit 198. Write control circuit 198 writes in all zeros in the memory address location to effectively erase the stored information and transmits a write enable signal (which initiates a release sequence for special service control 82) to an AND gate 318. AND gate 318 is enabled during the next time slot TS59 after compare circuit 276, erase flip-flop 306 and write control 198 have been enabled and AND gate 318 enables a number seven coder which sends a signal to register 34 requesting seizure of an erase indicator trunk 78. The erase indicator trunk 78 when seized sends back a double tone to the original calling line 26*a*–26*n* to indicate that the previously stored information has been erased. The original calling subscriber may then return his headset on hook and subsequent calls to the original calling line 26*a*–26*n* are terminated in the conventional manner. CRTO flip-flop 152** is reset during time slot TS64.

Figure 6:
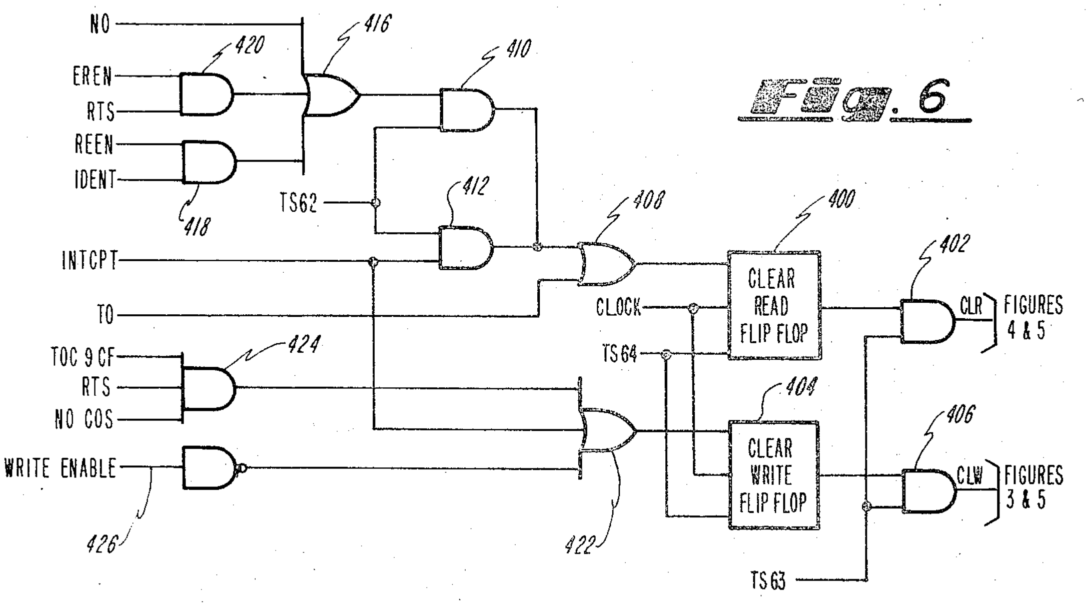
FIG. 6 is a block diagram showing portions of the call forwarding system which are associated with release sequence operations for resetting circuitry which is utilized in the write-in, read and erase modes of operation of the call forwarding system.

Referring now to FIG. 6, the operation of the release sequence circuitry of the call forwarding system 22 will now be described in greater detail.

The release sequence circuitry includes a clear read flip-flop 400, which is arranged to enable an AND gate 402 during time slot TS63 to provide a CLR release signal which resets read flip-flop 238, and TQM flip-flop 226 and clears type of call store circuit 302, and includes a clear write flip-flop 404 which is arranged to enable an AND gate 406 during time slot TS63 to provide a CLW signal which resets the write flip-flop in write control 198 and clears type of call store circuit 148. Clear read flip-flop 400 is set when an OR gate 408 is enabled. OR gate 408 may be enabled by a TO signal (The TO signal indicates a count of 32 on the synchronous binary counter in forward timing circuit 120 and is furnished after a memory request eleven signal is transmitted.). The other input to OR gate 408 is energized when either an AND gate 410 or an AND gate 412 is enabled. AND gates 410 and 412 are enabled during call forwarding system time slot TS62 if special service control 82 has generated an intercept (INTCPT) signal (indicating a request by special service control 82 for connection to an intercept trunk) or if an OR gate 416 is enabled by any one or the following conditions:

*a.* a NO signal has been sent to number translator 46 by special service control 82 during the read mode of operation of the call forwarding system to indicate that an original calling line **26*a*–26*n*** has not requested call forwarding services;

*b.* an AND gate 418 has been enabled during the read mode of operation of call forwarding system 22 when read enable flip-flop has been set (a REEN signal has been generated) and identity flip-flop 196 has been set; or

*c.* an AND gate 420 has been enabled when erase flip-flop 306 has been set (EREN) during a period when compare circuit 276 has an RTS output.

Clear read flip-flop 400 is subsequently set by the next clock pulse (CPM) and is reset during call forwarding system time slot TS64.

Clear write flip-flop 404 is enabled when an OR gate 422 has been enabled by any one of the following conditions:

*a.* special service control 82 has transmitted an intercept signal over line 414 to request connection to an intercept trunk;

*b.* a type of call nine has been indicated (requesting the write mode of operation of call forwarding system 22), compare circuit 164 has an RTS output and a NO COS signal (indicating that the calling line does not have the call forwarding class of service) has been sent by number translator 46 to enable an AND gate 424 which defines an input to OR gate 422; or

*c.* a write enable signal (indicating that all zeros have been written into the memory) generated by write control 198 during the erase mode of operation of call forwarding system 22 is present on line 426.

Clear write flip-flop 404 is set by the next clock pulse (CPM) and is reset during call forwarding system time slot TS64.

Figure 7:
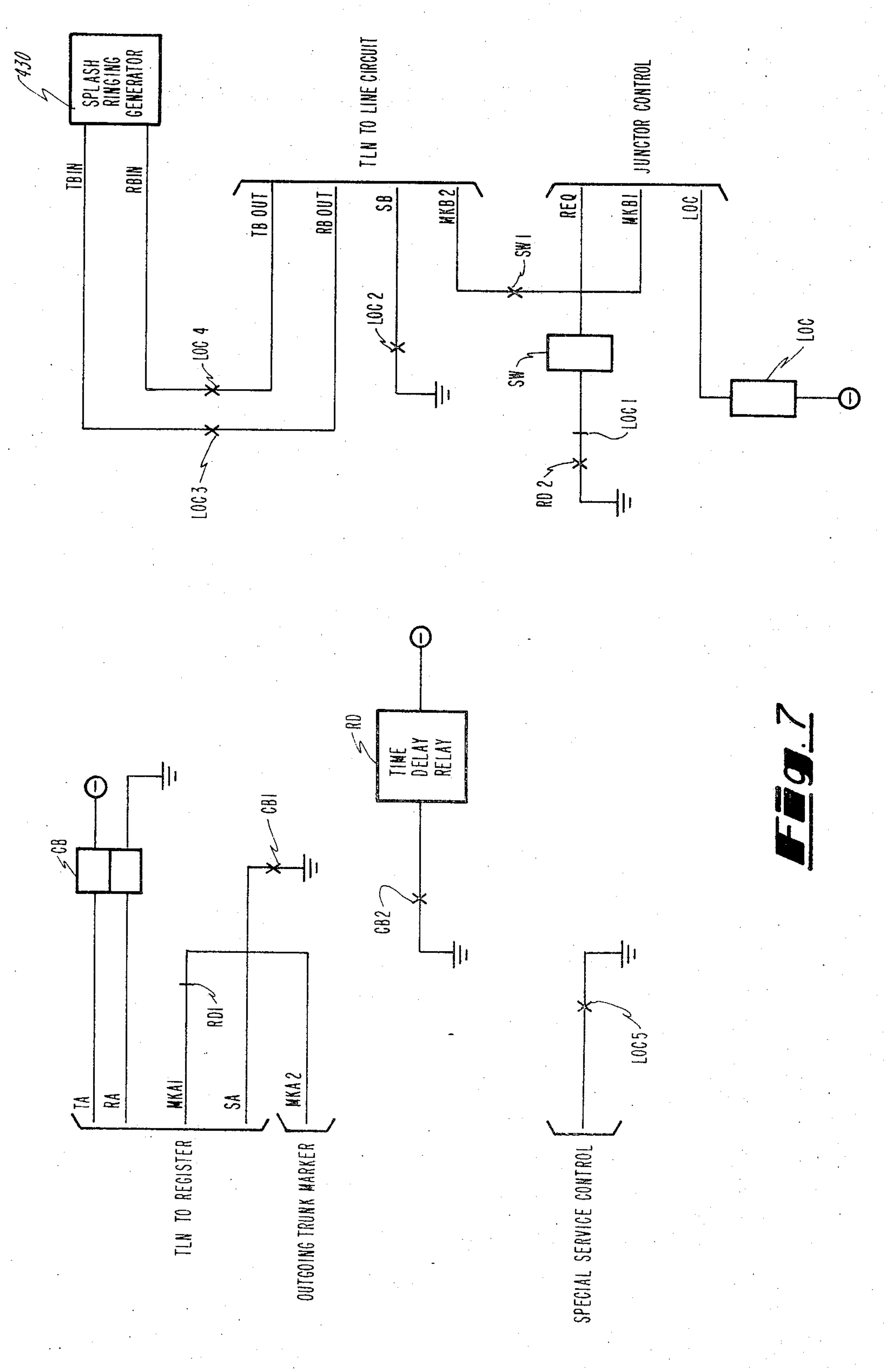
FIG. 7 is an electrical schematic wiring diagram showing portions of a splash ring trunk circuit which are utilized during call forwarding calls.

FIG. 7 includes a detailed description of the splash ring trunk 80 previously mentioned. When the special service control 82 determines that a subscriber has requested call forwarding services, the number translator 46 sends a signal to the outgoing trunk marker 70 to seize and mark the splash ring trunk 80. The mark signal from the outgoing marker trunk 70 is transmitted via lead MKA2, contact RD-1 and lead MKA1 to one end of the TLN network 52. Simultaneously therewith a mark potential is applied from the sender 42 via the corresponding local registers 34, the SLN 36, and the local junctor 28 connected thereto, to the other side of the TLN network 52. Junctor control 32 is also enabled to complete a connection from the tip and ring lines TA and RA to the sender 42. When the connection is completed, the circuit to a relay CB is completed and the relay CB is actuated to apply a ground via contact CB-1 on the sleeve lead SA to hold the connection. A ground is also applied via contact CB-2 to a time delay relay RD, which in turn, opens contact RD-1 and the mark leads MKA1 – MKA2 to maintain the splash ring trunk 80 busy.

The relay RD also applies a ground via contact RD-2, contact LOC-1 and a relay coil SW to the line REQ, which extends to the junctor control 32 to request a connection between the splash ring trunk 80 and the line circuit 26*a*–26*n* of the original call forwarding party (or forwardee). The line circuit of the original call forwarding party was previously marked by the number translator 46 via the line scanner-marker 50. The ground via the contact RD-2 also operates the relay SW which in turn completes via contact SW-1 a connection through mark lead MKB1 – MKB2 between the junctor control 32 and the TLN. At this time the connection is established between the splash ring trunk 80 and the original call forwarding party line circuit 26*a*–26*n*. The junctor control 32 now applies a signal on lead LOC to operate the relay LOC. The relay LOC, when operated, applies via contact LOC-2 a ground signal to the sleeve lead SB to maintain the connection to the line circuit and contact LOC-1 opens the lead REQ to remove any further requests to the junctor control 32 and also drops out the relay SW (opening contact SW1), which in turn make the mark leads MKB1 – MKB2 busy. When the relay LOC operates, a connection is also established via contacts LOC-3 and LOC-4 between a ringing generator 430 and the tip and ring lines TB and RB extending to the original call forwarding line circuit 26*a*–26*n* to provide a short burst of ringing signals thereto. The relay LOC also applies a ground via contact LOC-5 to a special service control 82 to start a time-out cycle after which period the splash ring trunk 80 is released.

The splash ring generator 430 provides a short distinct burst of ringing signals to the ringer of the original call forwarding party, this short burst is clearly distinguishable from the normal ringing signals and provides a clear indication to the call forwarding party (forwarder) that a call is being diverted to the call forwarding number (forwardee). The original call forwarding party (forwarder) upon recognizing this distinct short burst of ringing signals will then know that his telephone is operating in the call forwarding mode of operation. If he wishes to continue to have his calls forwarded, the subscriber will take no action On the other hand, if he wishes to terminate the call forwarding mode of operation, he will dial the appropriate (73) code for erasing the information from the memory as described above. Hence, as can be seen, the original call forwarding party (forwarder) will be continuously notified each time a call is diverted, that his telephone set is in the call forwarding mode of operation. Therefore, there is no need to connect the original call forwarding party (forwarder) to an announcement trunk and ring the party in a normal manner to have the subscriber go off hook and receive a recorded announcement. Furthermore, there is no need for a time-out circuit to automatically terminate the call forwarding mode of operation since the original call forwarding party (forwarder) will be signalled each time a call is being diverted. Hence, there is no need to meet a particular time-out schedule to assure that calls (that would otherwise be missed in the event that the call forwarding mode of operation is terminated prior to the return of the forwarder subscriber to his telephone station) are received.

What is claimed is:

1. A call forwarding arrangement for automatically forwarding calls by a calling subscriber station originally directed to a forwarder subscriber station to a forwardee subscriber station, for use in a telephone system including a common control having a plurality of registers for connection to any of a plurality of subscriber stations for receiving dial pulses therefrom, said call forwarding arrangement comprising:

a memory for the random storage of equipment numbers of said forwarder and forwardee subscriber stations;

means for identifying any one of the plurality of registers having a call forwarding request or call forwarding erase codes dialed therein by a calling forwarder subscriber station connected to the register by the common control;

message storage circuit means responsive to a call forwarding request code dialed in an identified register for receiving from the common control the identity and class of service of the forwarder subscriber station connected to the identified register, for receiving from the identified register the number of a forwardee subscriber station subsequently dialed into the register by the forwarder subscriber station, and for storing into said memory the forwarder subscriber identity and forwardee number;

memory erase circuit means responsive to a call forwarding erase code dialed in the identified register for receiving from the common control the identity and class of service of a forwarder subscriber station connected to an identified register for erasing from said memory the corresponding forwarder subscriber station identity and forwardee subscriber station number previously stored therein, and call diverter circuit means for identifying any one of the plurality of registers connected to a calling subscriber station by the common control and having the number dialed therein corresponding to a forwarder subscriber station having its identity stored in said memory for changing the number in the identified register to the corresponding forwardee subscriber station number stored in said memory.

2. A call forwarding arrangement as defined in claim 1 wherein said call diverter circuit means includes:

means for applying a short burst of ringing signals to the forwarder subscriber station prior to changing the number in said register.

3. Apparatus for automatically forwarding calls by a calling subscriber station originally directed to a forwarder subscriber station to a forwardee subscriber station comprising:

a switching network;

a plurality of subscriber stations connected to said network;

a common control system for receiving dialed information in registers for completing connections between said subscriber stations through said network;

a memory for the random storage of equipment numbers of said forwarder and forwardee subscriber stations;

means controllable by a forwarder subscriber station for receiving from said common control a designation of a forwardee subscriber station to which calls to said forwarder subscriber station are to be forwarded and storing such designations along with the identity of the forwarder subscriber station in said memory, and means responsive to an attempted connection from a calling subscriber station being directed to said forwarder station for applying via the common control a distinct ringing signal to said forwarder station indicating that the attempted connection is being inhibited and for changing the dialed information in said common control registers for establishing a connection through said switching network between the calling subscriber station and said forwardee subscriber station wherever said memory includes the identity of the forwardee station along with the forwarder station.

4. A call forwarding arrangement for automatically forwarding calls by a calling subscriber station originally directed to a forwarder subscriber station to a forwardee subscriber station for use in a telephone system including a common control having a plurality of registers connectable by the common control to any of a plurality of subscriber stations, a translator connected to the plurality of registers for converting dialed directory numbers received from the subscriber station into equipment numbers for completing connections, the translator having means for associating the individual identities of subscriber stations connected by the common control to the registers and their class of service, said call forwarding arrangement comprising:

a memory for the random storage of equipment numbers of said forwarder and forwardee subscriber stations;

means for identifying a register having a call forwarding service request or call forwarding erase codes dialed therein by a calling forwardee subscriber station connected thereto by the common control which has a call forwarding class of service;

means responsive to the service request code dialed into an identified register for inserting into said memory the identity of a forwarder subscriber station along with the number of the forwardee station to which the call is to be forwarded that is subsequently dialed into the identitied register by the forwarder subscriber station connected thereto;

means responsive to the erase code dialed into an identified register for erasing from said memory the identity of a forwarder subscriber station connected to the identified register along with the number of the forwardee subscriber station;

means for identifying a register connected to a calling subscriber having a number dialed therein of acalled subscriber having a call forwarding class of service for determining if the called subscriber identity is stored in said memory along with a number to which the calls are to be forwarded;

means responsive to a determination that the dialed number in an identified register corresponds to a called forwarder subscriber station having requested call forwarding services for changing the number of the forwarder subscriber stations in the identified register to the number of the forwardee subscriber station in said memory and for enabling the common control to complete the connection between the calling subscriber station and the forwardee subscriber station, and means responsive to a determination that the dialed number in an identified register corresponds to a called subscriber not requesting call forwarding services for enabling the common control to complete a connection between the calling and called subscriber stations.

5. A call forwarding arrangement for automatically forwarding class by a calling subscriber station originally directed to a forwarder subscriber station to a forwardee subscriber station for use in a telephone system including a common control having a plurality of registers for connection by the common control to any of a plurality of subscriber stations, a translator connected on a time divided scanning basis to individual ones of the plurality of registers for converting directory numbers into equipment numbers for completing connections through the telephone system, the translator having means for associating the identities of subscriber stations connected by the common control to any one of the registers along with the class of service assigned to the subscriber stations, said call forwarding arrangement comprising:

a memory;

first means, synchronized with the time divided scanning of the registers, for identifying a register having a call forwarding service request dialed therein by a forwarder subscriber station identified by the translator having a call forwarding class of service;

second means, synchronized with the time divided scanning of the registers, responsive to the identification of a register by said first means for clearing the code dialed in the register and sending a dial tone for signalling the forwarder subscriber station to dial the number of a forwardee subscriber station to which the calls are to be transferred;

third means, synchronized with the time divided scanning of the registers, responsive to the completion of the dialing of the number of the forwardee subscriber station in the register identified by the first means for inserting into said memory the number of the forwardee subscriber station in the register along with the forwarder subscriber station identity;

fourth means responsive to the storage of the number of the forwardee subscriber station and the forwarder subscriber station identity into the memory by said third means for signalling the common control to complete a connection between the forwarder subscriber station and the forwardee subscriber station;

fifth means, synchronized with the time divided scanning of said register, for identifying a register, connected to a calling subscriber station, having number dialed therein of a called subscriber station having a call forwarding class of service for determining if the called subscriber station identity is stored in said memory along with a forwardee subscriber station number;

sixth means, responsive to a determination by said fifth means that the called subscriber station identity is not stored in said memory, for signalling the common control for completing the connection between the calling and called subscriber stations;

seventh means, responsive to a determination by said fifth means that the called subscriber station identity is stored in said memory, for signalling the common control to complete a connection between a ringing circuit and the called forwarder subscriber station for signalling with a short burst of ringing signals the called forwarder subscriber station that the attempted connection thereto is being inhibited and diverted to a forwardee subscriber station;

eighth means, responsive to the signalling of the called forwarder subscriber station of the diverted call by said seventh means, for substituting the number of the forwardee subscriber station in memory for the number dialed in the identified register that is connected to the calling subscriber stations;

ninth means, responsive to the substitution of numbers in said identified register connected to the calling subscriber station by said eighth means, for signalling the common control to complete the connection between the calling subscriber station and the forwardee subscriber station;

tenth means, synchronized with the time divided seanning of the register, for identifying a register having a call forwarding service removal request dialed therein by a subscriber station identified by the translator having a call forwarding class of service;

eleventh means, responsive to the removal request in a register identification by said tenth means, for locating the storage in memory of the subscriber station requesting removal of service and removing the subscruber station identity and forwardee subscriber station number associated therewith from the memory, and twelfth means, responsive to the removal of the subscriber station identity and forwardee subscriber station number from memory by said eleventh means, for signalling the common control to complete a connection between a signalling circuit and the forwarder subscriber station to notify the forwarder subscriber station that the call forwarding service has been terminated.

6. A call forwarding arrangement as defined in claim 4 wherein said means for identifying said call forwarding request and erase codes includes means for receiving from said translator a signal that a code is present, effective upon receipt of said signal to enable means for storing a type of call signal from said translator corresponding to the code dialed, said means for storing being connected to decoding means adapted to discriminate between different ones of said type of call signals for enabling said means for inserting if a call forwarding request is decoded and for enabling said means for erasing if a call forwarding erase code is decoded.

7. A call forwarding arrangement as defined in claim 6 wherein said means for identifying includes means for storing the time slot of the register identified upon receipt of said signal that a code is present.

8. A call forwarding arrangement as defined in claim 7 wherein said means for identifying includes means for comparing said stored time slot for identity with the current time slot of said translator and for producing an enabling signal to said means for inserting, said means for erasing and said means for changing when an identity is detected by said means for comparing.

9. A call forwarding arrangement as defined in claim 8 wherein said means for inserting includes means, enabled by a signal from said comparing means, for signaling said register to erase said dialed code and for signaling said register thereafter to return a second dial tone to the forwardee subscriber connected thereto.

* * * * *